(12) United States Patent
Yan et al.

(10) Patent No.: US 8,838,512 B2
(45) Date of Patent: Sep. 16, 2014

(54) RANDOM WALK ON QUERY PATTERN GRAPH FOR QUERY TASK CLASSIFICATION

(75) Inventors: Jun Yan, Beijing (CN); Ning Liu, Beijing (CN); Lei Ji, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 13/089,103

(22) Filed: Apr. 18, 2011

(65) Prior Publication Data

US 2012/0265760 A1 Oct. 18, 2012

(51) Int. Cl.
*G06F 7/00* (2006.01)
*G06N 5/02* (2006.01)
*G06F 17/30* (2006.01)

(52) U.S. Cl.
CPC .................. *G06F 17/30864* (2013.01)
USPC ................ 706/20; 706/46; 707/765; 707/740

(58) Field of Classification Search
None
See application file for complete search history.

(56) References Cited

U.S. PATENT DOCUMENTS

| | | |
|---|---|---|
| 2008/0208841 A1 | 8/2008 | Zeng et al. |
| 2009/0160860 A1 | 6/2009 | Slaney et al. |
| 2009/0327260 A1* | 12/2009 | Li et al. ............................ 707/5 |
| 2009/0327269 A1 | 12/2009 | Paparizos et al. |
| 2010/0030768 A1 | 2/2010 | Poblete et al. |

OTHER PUBLICATIONS

Beitzel et al., "Automatic Classification of Web Queries Using Very Large Unlabeled Query Logs", Apr. 2007, Transacations on Information Systems, vol. 25 No. 2, pp. 1-29.*
Li et al., "Learning Query Intent from Regularized Click Graphs", Jul. 2008, SIGIR, pp. 1-8.*
Song et al., "Optimal Rare Query Suggestion with Implicit User Feedback", Apr. 26-30, 2010, pp. 901-910.*
Jiang, et al. "Web Search/Browse Log Mining: Challenges, Methods, and Applications" Retrieved Date: Nov. 24, 2010 http://research.microsoft.com/en-us/people/hangli/web_search_and_browse_log_mining.pdf 308 pages.
Ling, et al. "Improving Encarta Search Engine Performance by Mining User Logs" Published Date: 2002 http://research.microsoft.com/en-us/um/people/jfgao/paper/IJPRAI-final.pdf, 12 pages.
Poblete, Query Based Data Mining for the Web Published Date: 2009 http://www.tesisenred.net/TESIS_UPF/AVAILABLE/TDX-0921110-120627//tbp.pdf, 136 pages.
Sadikov, et al. "Clustering Query Refinements by User Intent"—Published Date: Apr. 26-30, 2010 http://www.stanford.edu/esadikov/www2010_paper.pdf, 10 pages.
Wnag et al. "Competitive Analysis from Click-Through Log"—Published Date: Apr. 20-24, 2009 http://www2009.org/proceedings/pdf/p1051.pdf 2 pages.

* cited by examiner

*Primary Examiner* — Lut Wong
*Assistant Examiner* — Paulinho E Smith
(74) *Attorney, Agent, or Firm* — Dan Choi; Judy Yee; Micky Minhas

(57) ABSTRACT

A classification process may reduce the computational resources and time required to collect and classify training data utilized to enable a user to effectively access online information. According to some implementations, training data is established by defining one or more seed queries and query patterns. A bi-partite graph may be constructed using the seed query and query pattern information. A traversal of the bi-partite graph can be performed to expand the training data to encompass sufficient data to perform classification of the present search task.

20 Claims, 10 Drawing Sheets

RANDOM WALK ON QUERY PATTERN GRAPH FOR QUERY TASK CLASSIFICATION

BACKGROUND

As the internet continues to grow, search engines play an increasingly important role for users to effectively access online information.

During a search process, a query is generally initiated by a user that is trying to accomplish a specific task during a search. Topic detection technology or relevance ranking technology, as utilized by currently available search engines, does not typically possess enough precision to determine the task that is associated with the query. Therefore, the search engine may not be able to ascertain the user intent, and therefore may not return the results that best correspond to the task that is intended to be accomplished by the user.

Determining a query that aligns with a specific task may present many obstacles for the client and/or the server. For example, to classify a query into a predefined task category, there must be sufficient training data available to perform the classification. The computational resources and time required to collect and classify training data may be considerable.

SUMMARY

Some implementations herein include a search task classification process to reduce computational resources used by a client and/or a server during the classification of a user search query. In an example implementation, training data is established by defining one or more seed queries and query patterns. For example, user searches that were previously performed may be accessed to determine a set of training data utilized for classification of a present search task. A bi-partite graph may be constructed using the seed query and query pattern information. A traversal of the bi-partite graph can be performed to expand the training data to encompass sufficient data to perform classification of the present search task.

In some implementations, a task classification module is used to consolidate and classify query data. For example, the task classification module may determine a set of predefined categorized search tasks. The predefined categorized search tasks may then be accessed to classify a search task extrapolated from a present search query.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

Some implementations herein provide classification processes for the classification of an input query according to a search task. More specifically, an example process may classify a user query using a library of predefined search task categories.

As disclosed herein, a classification process may reduce the computational resources and time required to collect and classify training data utilized to enable a user to effectively access online information. According to some implementations, training data is established by defining one or more seed queries and query patterns. A bi-partite graph may be constructed using the seed query and query pattern information. A traversal of the bi-partite graph can be performed to expand the training data to encompass sufficient data to perform classification of the present search task.

The techniques and systems described herein may be implemented in a number of ways. Example implementations are provided below with reference to the following figures.

Exemplary Environment

Figure 1:
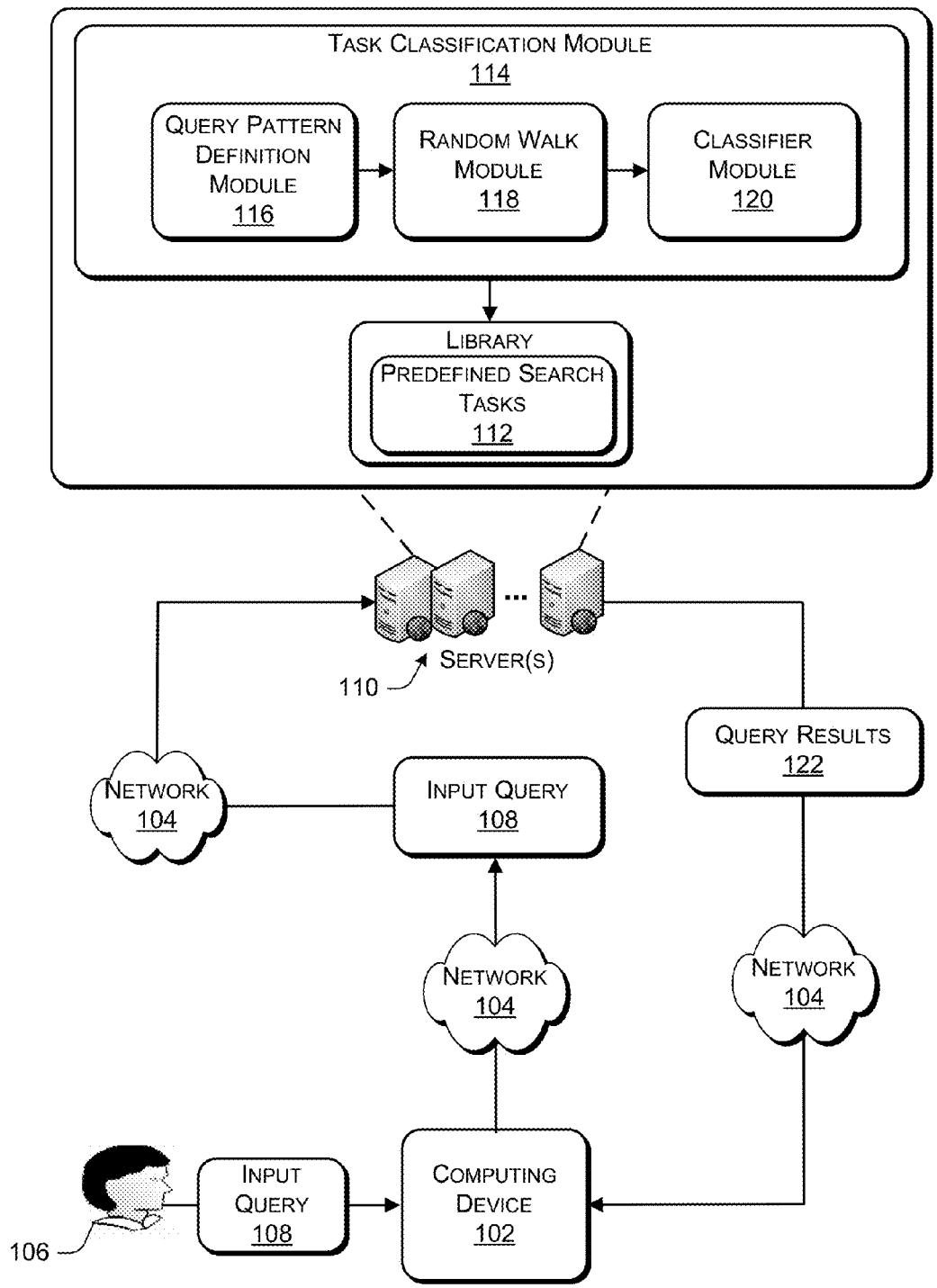
FIG. 1 is a schematic of an illustrative environment for a classification framework.

FIG. 1 is a block diagram of an example environment 100, which may be used as a framework for returning to a computing device the most useful information in response to a user query by utilizing task matching. The environment 100 includes an example computing device 102, which may take a variety of forms including, but not limited to, a portable handheld computing device (e.g., a personal digital assistant, a smart phone, a mobile phone), a laptop computer, a desktop computer, a media player, a digital a set top box, a gaming console, an audio recorder, a camera, or any other similar device.

The computing device 102 may connect to one or more network(s) 104 and may be associated with a user 106. The computing device 102 may receive an input query 108 from the user 106. The input query 108 may utilize, without limitation, a web search query, whereby the user 106 enters the input query into a World Wide Web (hereinafter "web" or WWW) search engine. The input query 108 may be communicated over network 104 to at least one server 110 associated with the search engine utilized by the user 106. The input query 108 may be a request for information from server 110. The input query 108 may then be classified according to a library containing predefined search tasks 112. In one implementation, the library of predefined search tasks 112 may be created using a task classification module 114. The task classification module 114 may include a query pattern definition module 116, a random walk module 118, and a classifier module 120. Utilizing the predefined search tasks, the server 110 may classify the input query 108 into a popular search task, returning to the user an output result 122 that best corresponds to the input query 108.

Figure 2:
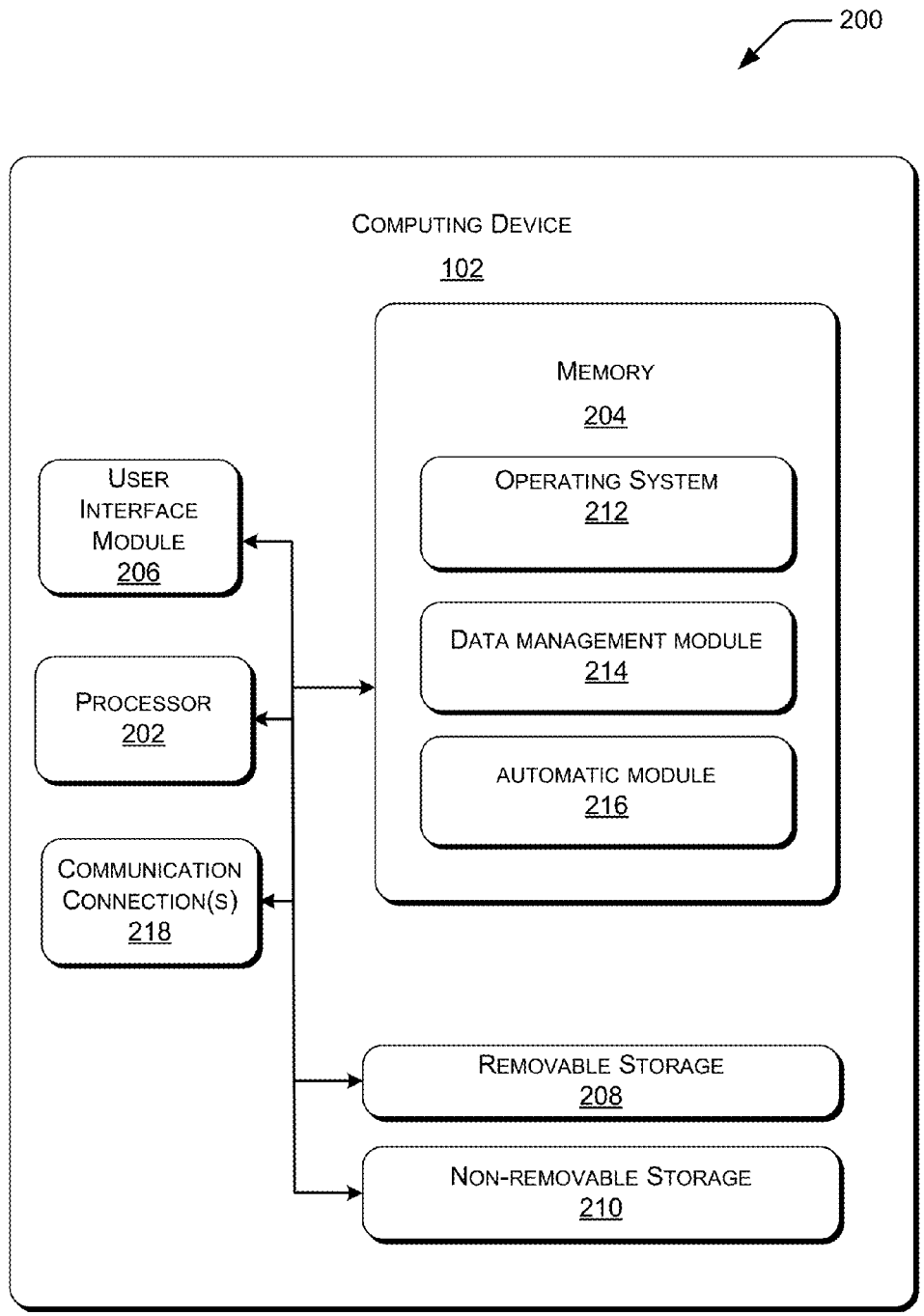
FIG. 2 is a block diagram of an example computing device within the classification framework of FIG. 1.

FIG. 2 is a schematic block diagram 200 of the example computing device 102. In one example configuration, the computing device 102 comprises at least one processor 202, a memory 204, and a user interface module 206. The processor 202 may be implemented as appropriate in hardware, software, firmware, or combinations thereof Software or firmware implementations of the processor 202 may include computer or machine executable instructions written in any suitable programming language to perform the various functions described.

The memory 204 may store programs of instructions that are loadable and executable on the processor 202, as well as data generated during the execution on these programs. Depending on the configuration and type of server, memory 204 may be volatile (such as RAM) and/or non-volatile (such as ROM, flash memory, etc.). The computing device 102 may also include additional removable storage 208 and/or non-removable storage 210 including, but not limited to, magnetic storage, optical disks, and/or tape storage. The disk drives and their associated computer-readable medium may provide non-volatile storage of computer readable instructions, data structures, program modules, and other data for the computing device 102.

The memory 204, the removable storage 208, and the non-removable storage 210 are all examples of computer-readable media. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 114, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 102. Any such computer storage media may be part of the computing device 102. Moreover, the computer-readable media may include computer-executable instructions that, when executed by the processor(s) 110, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

Turning to the contents of memory 204 in more detail, the memory may include an operating system 212. In one implementation, the memory 204 includes a data management module 214 and an automatic module 216. The data management module 214 stores and manages storage of information, such as images, equations, and the like, and may communicate with one or more local and/or remote databases or services. The automatic module 216 allows a classification process, as described herein, to operate without human intervention. The computing device 102 may also contain communication connection(s) 218 that allow the processor 202 to communicate with other services. The communications connection(s) 218 is an example of a communication medium that typically embodies computer-readable instructions, data structures, and program modules. By way of example and not limitation, communication medium includes wired media such as a wired network or direct-wired connection, and wireless media such as acoustic, RF, infrared and other wireless media.

The computing device 102, as described above, may be implemented in various types of systems or networks. For example, the computing device 102 may be a stand-alone system, or may be a part of, without limitation, a client server system, a peer-to peer computer network, a distributed network, a local area network, a wide area network, a virtual private network, a storage area network, and the like.

Figure 3:
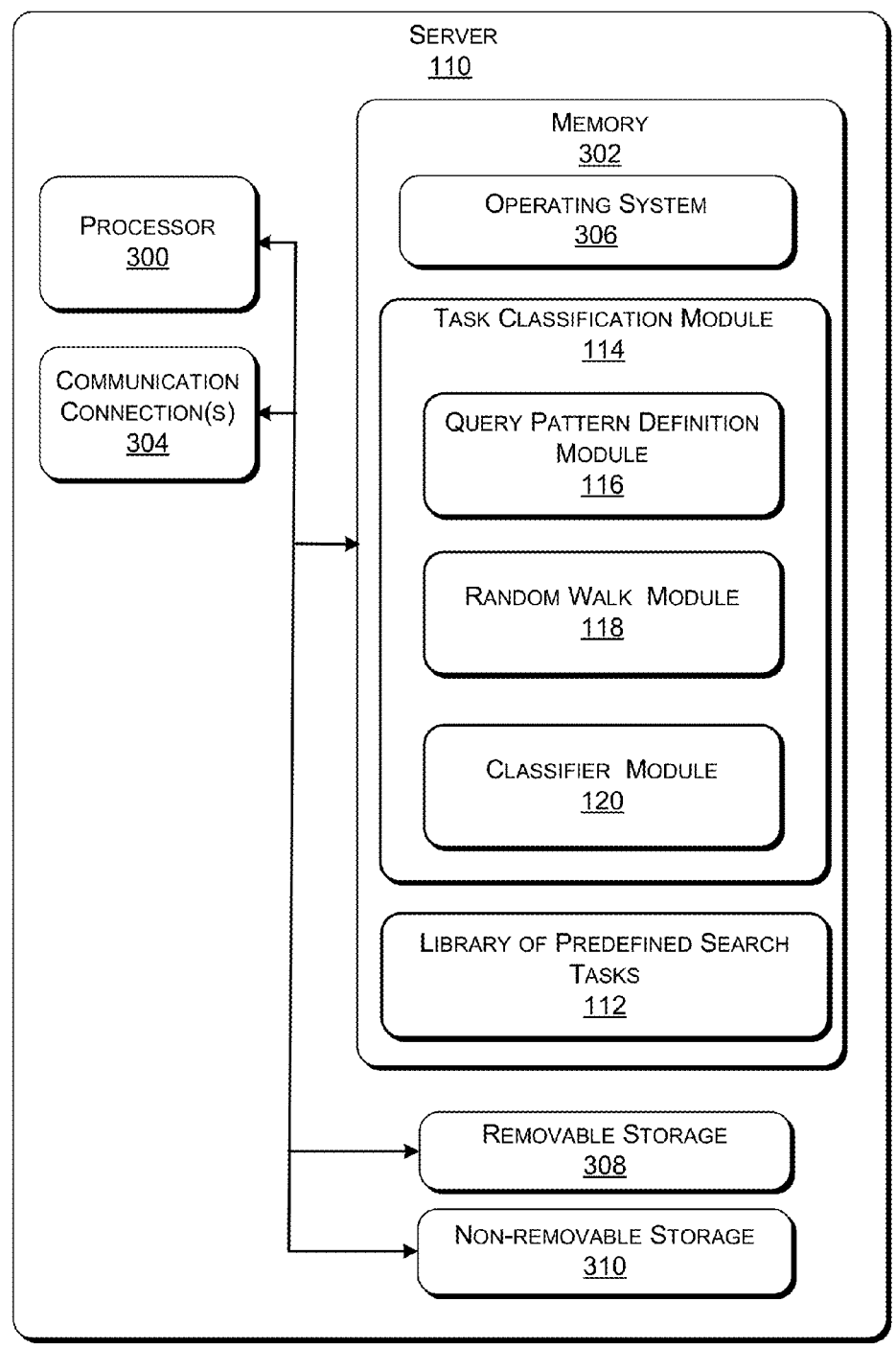
FIG. 3 is a block diagram of an example server within the classification framework of FIG. 1.

FIG. 3 illustrates the example server 110. The server 110 may be configured as any suitable system capable of providing computing services. In one example configuration, the server 112 comprises at least one processor 300, a memory 302, and a communication connection(s) 304. The communication connection(s) 304 may include access to a wide area network (WAN) module, a local area network module (e.g., WiFi), a personal area network module (e.g., Bluetooth®), and/or any other suitable communication modules to allow the server 110 to communicate over the network(s) 104, as shown in FIG. 1.

Turning to the contents of the memory 302 in more detail, the memory 302 may store an operating system 306, the library of predefined search task categories 112, the task classification module 114, the query pattern definition module 116, the random walk module 118, and the classifier module 120. The task classification module is further described below with respect to FIG. 4. While the task classification module 114 is illustrated in this example as a component within the server 110, it is to be appreciated that the task classification module may alternatively be, without limitation, a component within the computing device 102 or a standalone component.

The server 110 may also include additional removable storage 308 and/or non-removable storage 310. Any memory described herein may include volatile memory (such as RAM), nonvolatile memory, removable memory, and/or non-removable memory, implemented in any method or technology for storage of information, such as computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

The server 110 as described above may be implemented in various types of systems or networks. For example, the server may be part of, including but is not limited to, a data center, a server form, a client-server system, a peer-to-peer computer network, a distributed network, an enterprise architecture, a local area network, a wide area network, a virtual private network, a storage area network, and the like. For example, in one implementation, the server 110 may be associated with a web search engine such as Microsoft's Bing®.

Various instructions, methods, techniques, applications, and modules described herein may be implemented as computer-executable instructions that are executable by one or more computers, servers, or computing devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Exemplary Training Data Collection

Figure 4:
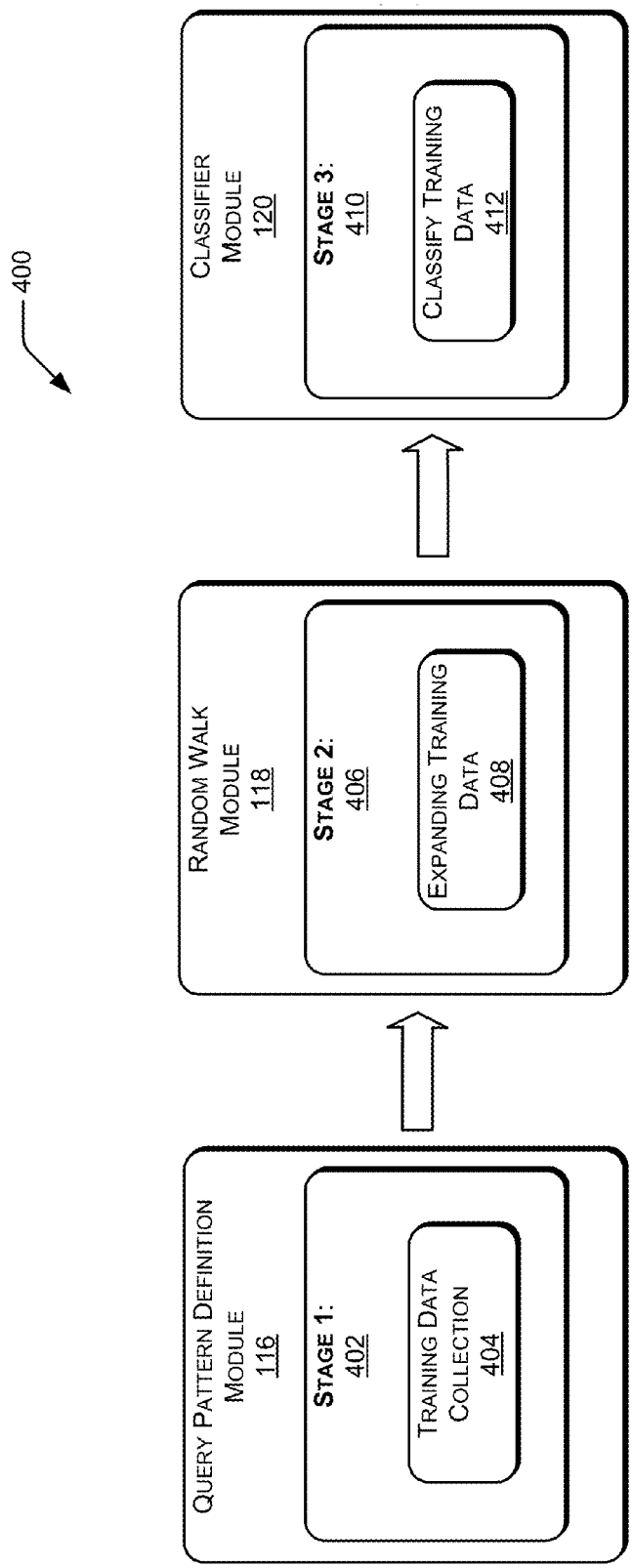
FIG. 4 is a diagram of an example classification process to collect and classify training data utilized to enable a user to effectively access online information.

FIG. 4 illustrates a process 400 for determining a search task associated with the user query 108. The process 400 includes, without limitation, a first stage 402 utilizing the query pattern definition module 116 to collect training data 404 (including at least query patterns and queries), a second stage 406 utilizing the random walk module 116 to create expanded training data 408, and a third stage 410 utilizing the classifier module 118 to create classified training data 412 to classify the input query 108 (shown in FIG. 1) using the previously established training data into the library of pre-defined search tasks 112. The classifier module 120 classifies the expanded training data, resulting in the library of pre-defined search task categories 112. The library may be accessed by the server 110 to classify the input query 108 and return output results 122 to the user 106.

While the process 400 is shown to include three stages, it is to be understood that additional as well as fewer stages may be used. Furthermore, even though stage 2 is illustrated to follow stage 1, and stage 3 is illustrated to follow stage 2, it is to be appreciated that the process 400 may proceed using any particular order.

Collecting sufficient and high quality training data using process 400 may present several obstacles. First, the implicit user's intent may be hard to label by a human editor if only based on the observed user behaviors. Second, it is highly costly to label user defined behavioral data on a large scale. The task classification module 114 may circumvent these obstacles, beginning with stage 1 of the process using the query pattern definition module 116. The query pattern definition module 116 may define several seed queries for each user query 108, which are described below.

Figure 5:
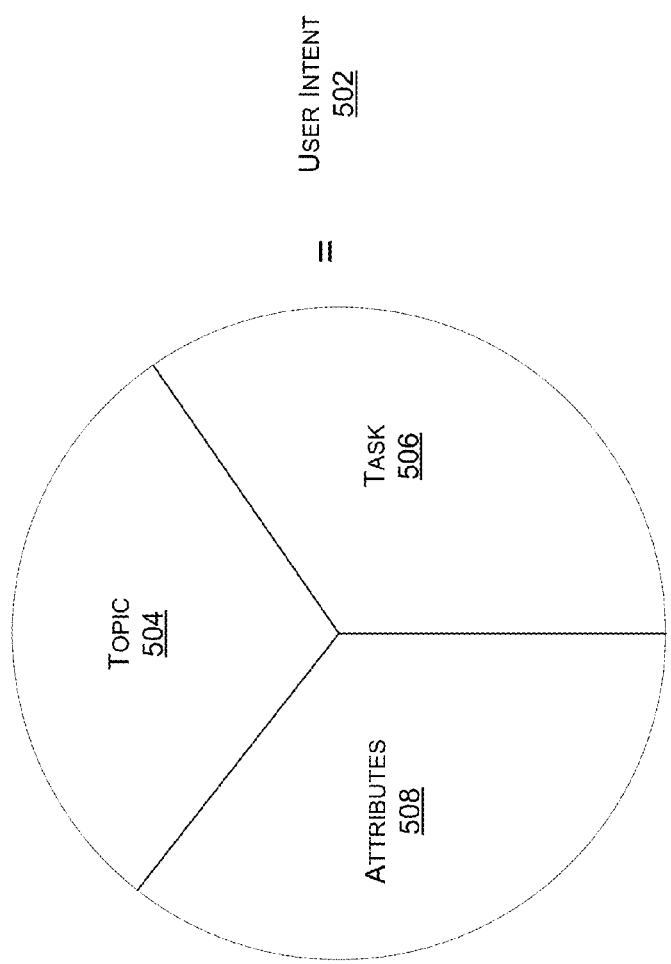
FIG. 5 is a diagram of an example deconstruction of a user query to effectively access online information.

As illustrated in FIG. 5, in one implementation, the seed query may be determined by decomposing the user query 108 to determine a user's intent 502. The user's intent 502 may be defined as computationally understanding what the user is attempting to accomplish with the input query 108. As illustrated in FIG. 5, to make that determination, the user's intent 502 may be deconstructed into three parts, a user's topic 504, a user's task 506, and a user's attributes 508. The user's topic 504 may be the domain or product category from which the user's search will begin. For example, if the user 106 has entered an input query of "best SUV cheaper than $20,000", the user's topic 504 would be Auto, SUV. The user's task 506 may be what the user is looking to do. Using the SUV example from above, in that example one scenario may be that the user is comparing SUV's under $20,000. The third part, or the user's attributes 508, defines what attributes are associated with the search. Again, using the SUV example, one attribute the user would like is "cheaper than $20,000". In one implementation, only a user query 108 that may be explicitly understandable by a human editor is deconstructed into the user's topic 504, the user's task 506, and the user's attributes 508. However, in other implementations any user query may be deconstructed using this approach. Once a substantial number of queries have been deconstructed, the queries may be summarized into one or more query patterns, where each established query pattern includes queries with similar user intent. For example, two separate queries "Canon 5D price" and "Nikon price' may be summarized into to the same query pattern "Product name+price". Therefore, the user's intent for each query may have been "buy product", that is the user may be checking the price of a product with the task of buying the product. Utilizing the assumption that if the two queries continually utilize the same web pages, it is highly probable that the two queries share the same search task and it may therefore be established as a query pattern.

Figure 6:
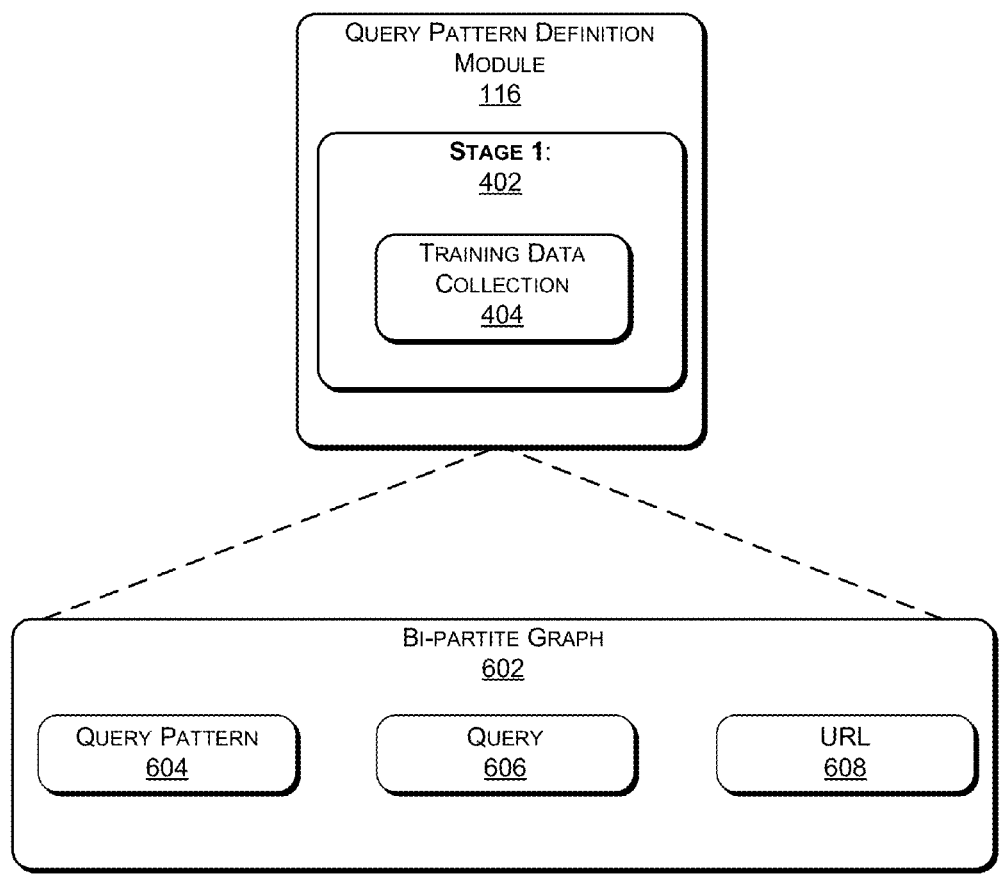
FIG. 6 is a diagram of an example first classification stage to collect and classify training data utilized to enable a user to effectively access online information.

FIG. 6 illustrates propagating the established training data using a bi-partite graph 602. In one implementation, the training data may consist of query patterns and user queries discussed above with respect to FIGS. 4 and 5. Using the training data collection 404, the bi-partite graph 602 may be constructed to enlarge and collect sufficient training data to adequately classify user search tasks for user's search queries. The bi-partite graph 602 may include at least three columns, a first column including the pre-established query patterns 604, a second column including the one or more queries 606 associated with the query pattern, and a third column including the resulting URLs 608 associated with each query.

Figure 7:
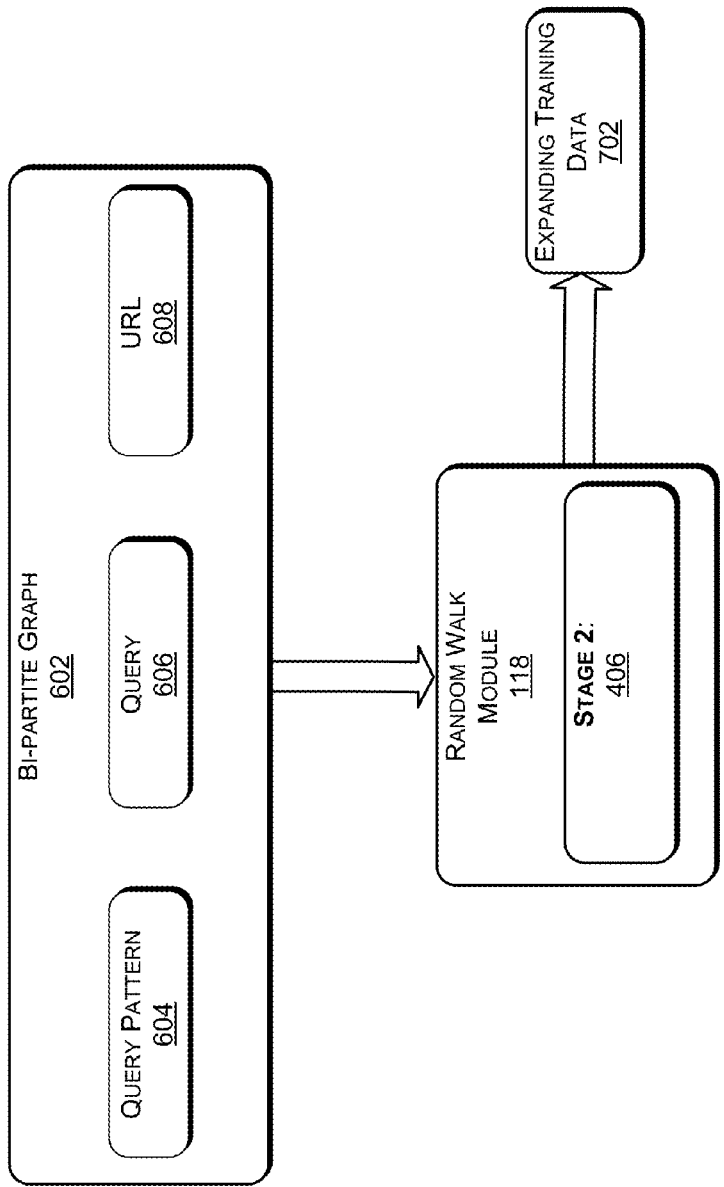
FIG. 7 is a diagram of an example second classification stage to collect and classify training data utilized to enable a user to effectively access online information.

As illustrated in FIG. 7, the bi-partite graph may be utilized by the random walk module 118 during stage 2 of the process 400, as described above with respect to FIG. 4, to create expanded training data 702 summarized during stage 2. In one implementation, the random walk module 118 may use a random walk algorithm to traverse an expanded bi-partite graph and create the expanded training data 702 utilized to classify a search task of the user query 108. It is to be appreciated however, that any algorithm may be used to traverse the bi-partite graph 602.

Figure 8:
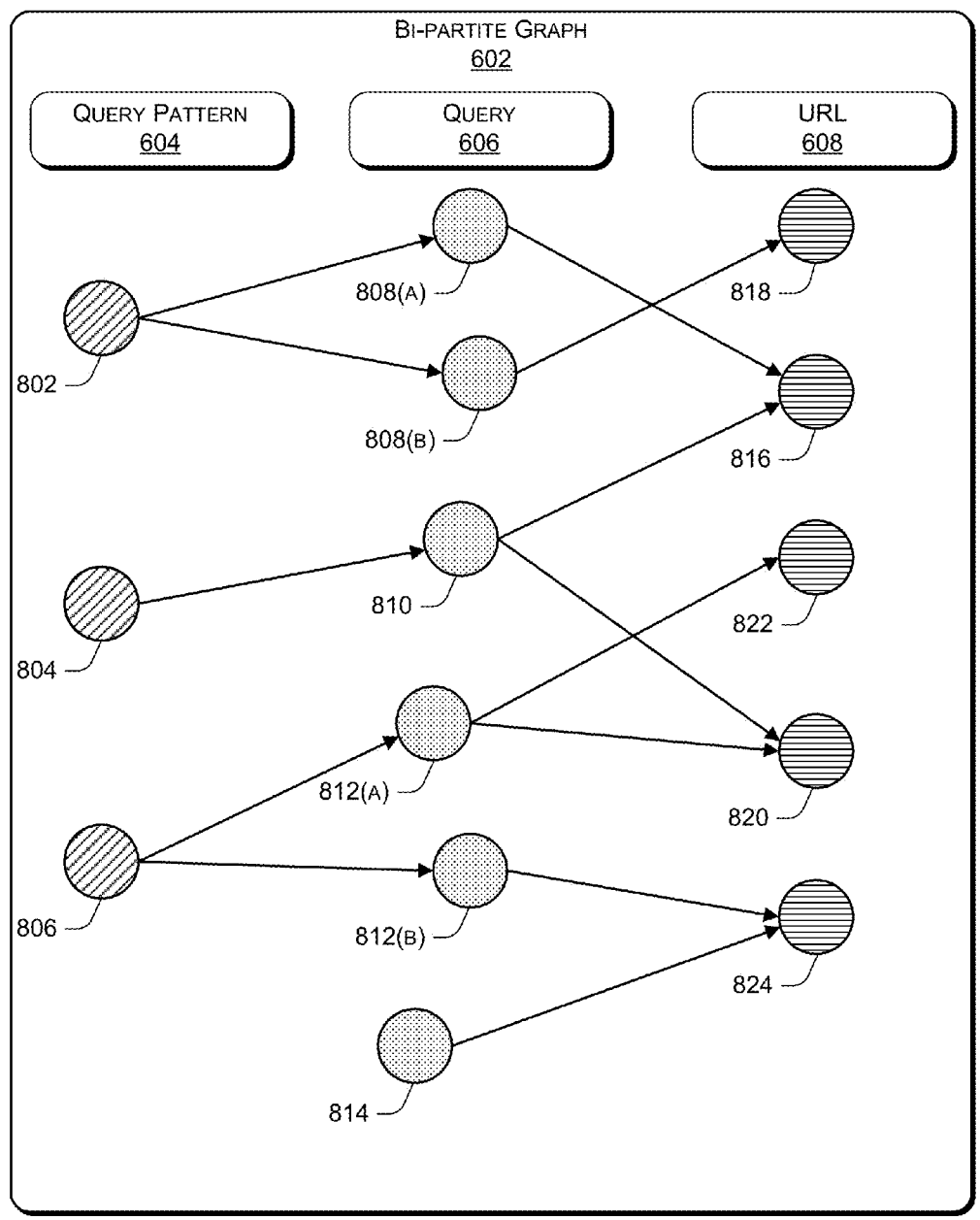
FIG. 8 is a diagram of an example bi-partite graph utilized to effectively access online information.

FIG. 8 illustrates the expanded bi-partite graph 602. The bi-partite graph 602 may be constructed using a query log, or a web-click through log. In one implementation, the web-click through log includes the records of a users' behavior when searching for information via a search engine. As shown, the bi-partite graph 602 may include, without limitation, a column for the query pattern 604, which may include previously established query patterns 802, 804, and 806. Each query pattern may include one or more queries in a column for the queries 606. For example, query pattern 802 may include query 808($a$) and 808($b$); query pattern 804 may include only one query 810, and query pattern 806 may include queries 812($a$) and 812($b$). As shown in FIG. 8, not every query may be associated with a query pattern. For example, query 814 does not appear to share a similar search task with any other query, and is therefore not summarized to be a part of any query pattern. Each query may then be mapped to a corresponding uniform resource locator (URL) in a column for the URLs 608. For example, query 808($a$) may be mapped to URL 816, query 808($b$) may be mapped to URL 816, query 810 may be mapped to both URL 816 and URL 820, query 812($a$) may be mapped to URL 820 and URL 822, while queries 812($b$) and 814 may be mapped to URL 824.

Furthermore, the query pattern may include contextual information such as, without limitation, time and location. For example, the query pattern 802 may include "[Restaurant],<dinner time> P(FindMap)=0.4, the query pattern 804 may include "[Restaurant], <far away> P(FindMap)=0.6, the query pattern 806 may include "[Restaurant] Location" P(FindMap)=0.8. The corresponding query, for example 808($a$), may include, without limitation, restaurants, restaurant locations, times available for reservations, and hours of the restaurant.

Figure 9:
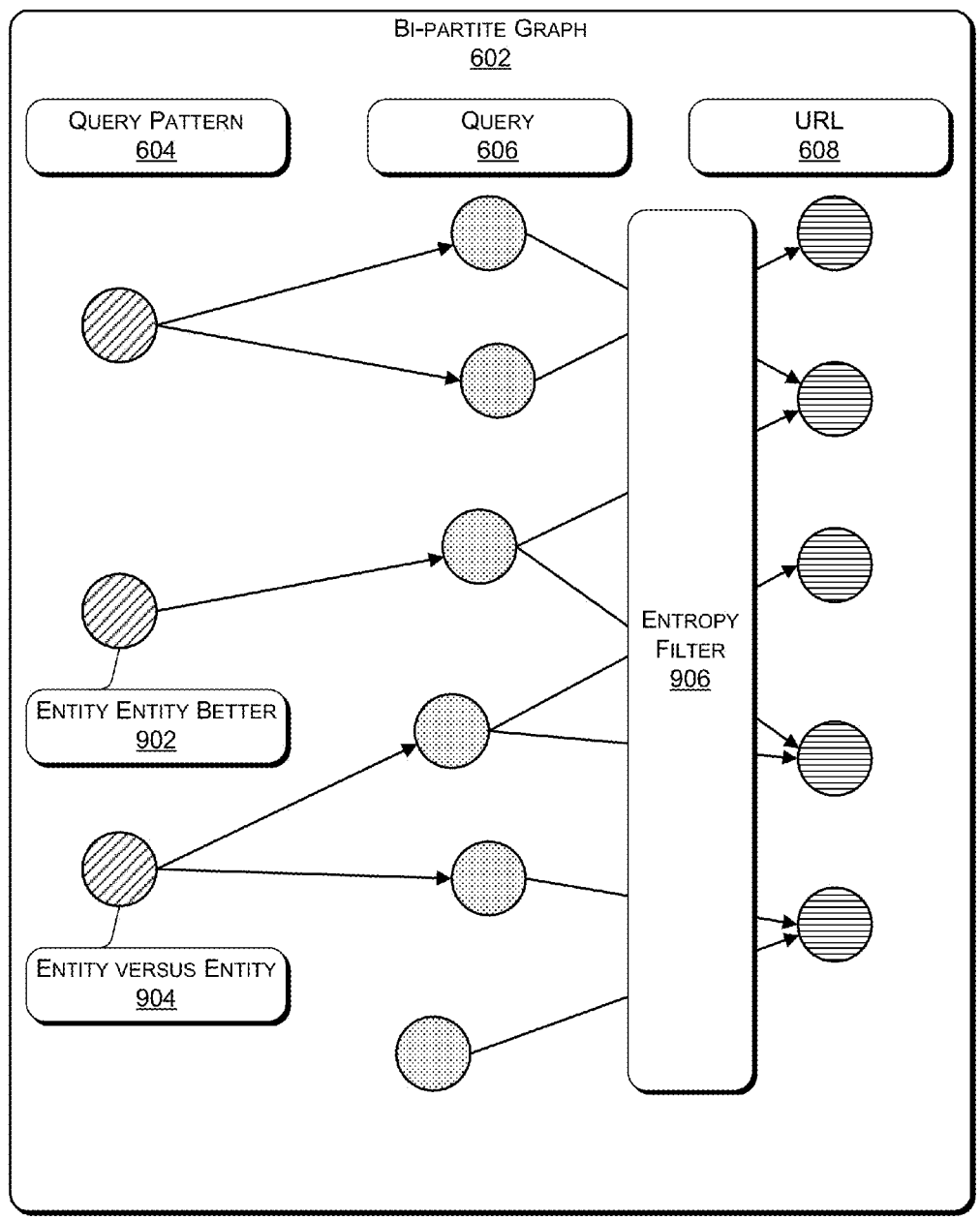
FIG. 9 is another diagram of an example bi-partite graph utilized to effectively access online information.

As shown in FIG. 9, to further aid in the collection of effective features for the classification of user intent, an element may be added to the bi-partite graph 602 which enables an entity to normalize a query and then index a query utilizing an n-gram bag of words model, such as entity-entity-better (EEB) 902 and entity-versus-entity (EVE) 904. For example, without limitation, in a car model domain, all of the names and their variances, such as "Honda Civic", "BMW X5", and "Toyota Camry", are considered as entities and may be represented by a common symbol "CarEntity". After collecting a full list of entities in each domain, all of the queries in different domains may be normalized by replacing entities using the same symbol. For instance, "Honda Civic price" and Toyota Camry price" may be equated as "CarEntity Price" after query normalization, although they are not similar in terms of keyword overlap before normalization. By way of further example, "Honda Civic price" and "Honda Civic refit" are normalized into to two completely separate ideas, which may be "CarEntity price" and "CarEntity refit, where they are similar in terms of keyword overlap before normalization. Therefore, as shown by this example, after normalizing the queries through the entities, the normalized queries may have a better ability to represent a user's intent within a search task.

In one implementation, the random walk algorithm utilized to traverse the bi-partite graph 602, for a given domain D and Intent I, may be as follows:

1. Let A={a|ads a ∈ D, and a have intent I}
2. Let Q={q|∃a ∈ A, q has impression on a}
3. Replace all entities in q ∈ Q, and get a pattern list PAT
4. Let URL={u|∃q,queryqclickedURLu}
5. Build a bipartite graph V=(PAT, URL), if there are k clicks between pattern pat and URL u, the weight for edge (pat, u) is k, note if query q can be represented by pattern pat, and q clicked u, we say pat click u
6. Manually select $PAT_{seeds}$={pat\patcan reflectintentI}
7. Starting from $Pat_{seeds}$, we use random walk to expend the seeds patterns, and get the final training data
8. Define transition probability as:

$$P_{trans}(K \mid j) = \frac{wjk}{\Sigma_l w_{jl}},$$

where $w_{jk}$ represents the weight for edge (j,k)
9. The probability that after t steps, we can reach point i as $P_t(i)$, such that:

$$P_t(i) = (1-s)x \sum_{j \neq i} P_{t-1}(j) x p_{trans}(i \mid j) + s x P_{t-1}(i)$$

10. Define Po(i)=1, where i ∈ $PAT_{seeds}$
11. Using this algorithm, one can calculate the probability Pt(i) for any given t and i; and select pattern pat that have Pt(pat)>θ, where θ is a manually defined parameter.

Using the random walk algorithm enables a set of training data to be expanded to encompass a considerable amount of additional training data, thereby enlarging the set of query patterns available for classification.

Also illustrated in FIG. 9 is an entropy filter 906. The entropy filter 906 may include, without limitation, multiple filters located between each column of the bi-partite graph 602. The entropy filter may aid in the elimination of noise produced by URLs accessed by users to accomplish multiple tasks. For example, if a URL is accessed by many queries across many domains, those URLs may be filtered out according to Equation 1:

$$entropy(j) = \sum_i \frac{w_{ij}}{\sum_k kj} \log(\frac{w_{ij}}{\sum_k kj}) \qquad \text{Equation (1)}$$

where URL u, having entropy (u)>θo, may be filtered out. In another example, if a URL is clicked almost equally by multiple seed patterns, those URLs may be filtered out as well. Such an example may be, if u is clicked 100 times from a seed pattern of "buy", and clicked 150 times from seed pattern of "repair", it may be filtered out.

Exemplary Process

Figure 10:
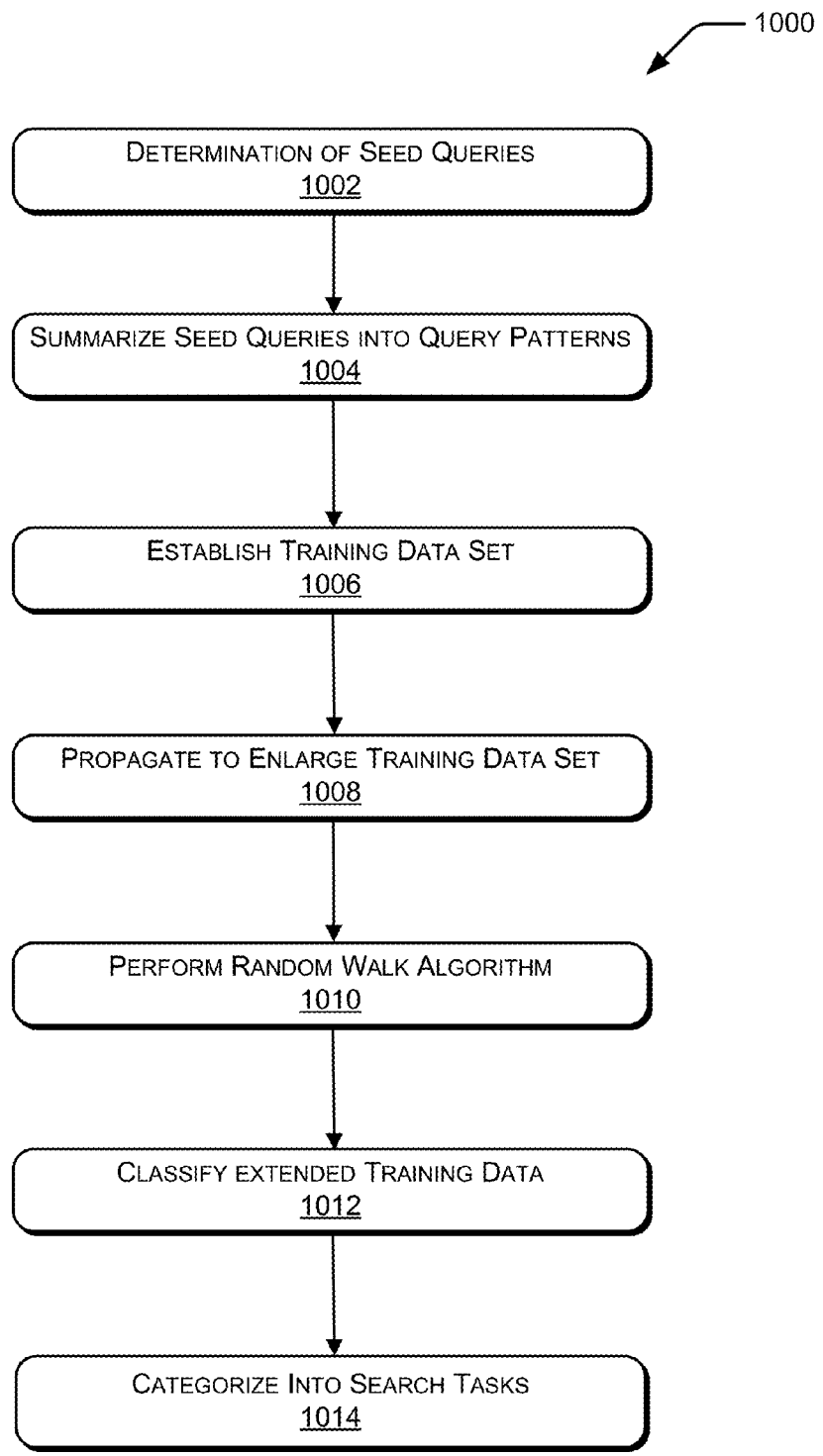
FIG. 10 is a flow diagram of an example process to classify a user query using a search task according to some implementations.

FIG. 10 illustrates a flow diagram of an example process 1000 outlining the classification of an input query. The process 1000 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Further, the process 1000 may, but need not necessarily, be implemented using the framework of FIG. 1.

At block 1002, the task classification module determines a seed query. The determination may be made using a query pattern definition module, and may be determined based upon a user's intent.

At block 1004, the seed queries are summarized by the query pattern definition module into corresponding query patterns. The query pattern definition module may define several seed queries for each user query. For example, if the two queries continually utilize the same web pages, it is highly probable that the two queries share the same search task and it may therefore be established as a query pattern. At block 1006, the query pattern definition module is further configured to establish a training data set using the seed query information.

At block 1008, the training data set is propagated using a bi-partite graph to enlarge the training data set. For example, using the training data, the bi-partite graph may be constructed to enlarge and collect sufficient training data to adequately classify user search tasks for user's search queries At block 1010, a random walk algorithm of the random walk module 118 may traverse the bi-partite graph enlarging the set of query patterns available for classification of a user query.

At block 1012, the classifier module classifies the expanded training data into one or more search task categories.

At block 1014, the classifier module is further configured to categorize the search tasks into a library accessible by a server and/or search engine to classify a search query entered by a user.

CONCLUSION

Although a classification process for the classification of an input query according to a search task has been described in language specific to structural features and/or methods, it is to be understood that the subject of the appended claims are not necessarily limited to the specific features or methods described. Rather, the specific features and methods are disclosed as example implementations.

What is claimed is:

1. A computer-implemented method comprising:
defining, using a definition module executable by a processor, a plurality of seed queries, each of the plurality seed queries corresponding to a query and associated with a task to be accomplished;
summarizing the plurality of seed queries into one or more query patterns based, at least in part, on the task to be accomplished associated with each of the plurality of seed queries, wherein each of the one or more query patterns is associated with a query pattern task to be accomplished;
determining a training data set comprising at least the plurality of seed queries and the query patterns;
creating a graph comprising the one or more query patterns connected to one or more uniform resource locators (URLs) by one or more weighted edges;
traversing the graph using a random walk algorithm to expand the training data set, wherein the random walk algorithm determines a plurality of transition probabilities such that each of the plurality of transition probabilities associates a query pattern of the one or more query patterns to a URL of the one or more URLs; and
classifying the expanded training data set into one or more search task categories, wherein each of the one or more search task categories is associated with a classified task to be accomplished based, at least in part, on the query pattern task associated with an associated query pattern.

2. The computer-implemented method of claim 1, wherein traversing the graph further comprises applying one or more entropy filters configured to reduce noise within the graph by removing a URL of the one or more URLs.

3. The computer-implemented method of claim 2, wherein the removed URL is connected to at least two query patterns by the one or more weighted edges.

4. The computer-implemented method of claim 1, wherein the one or more search task categories is used to classify a new search query according to a search task.

5. The computer-implemented method of claim 1, wherein the one or more seed queries comprise a user's topic, and a user's attributes.

6. The computer-implemented method of claim 1, wherein summarizing the one or more query patterns comprises recognizing queries with a same search task by examining a query's web-click log.

7. The computer-implemented method of claim 1, wherein the graph is a bi-partite graph comprising two columns that include a query pattern column and a URL column.

8. The computer-implemented method of claim 1, wherein the one or more weighted edges of the graph are created based, at least in part, on a number of clicks to a URL of the one or more URLs associated with a query pattern.

9. The computer-implemented method of claim 8, wherein a transition probability of the plurality of transition probabilities is determined based, at least in part, on the probability that a random walk of the graph beginning at the query pattern associated with the transition probability will include the URL associated with the transition probability, wherein each step of the random walk has a probability corresponding to an edge weight of the step as a fraction of the total edge weights of possible steps.

10. A system comprising:
a memory;
one or more processors coupled to the memory;
a task classification module stored in the memory and executable by the one or more processors, the task classification module configured to:
determine a set of training data using a query pattern definition module that is configured to determine a task to be accomplished by a query of one or more queries;
associate the one or more queries with one or more query patterns;
construct a graph using the query pattern definition module, the graph comprising the one or more query patterns associated with one or more search tasks by one or more weighted edges;
expand the graph using a random walk module configured to enlarge the graph to include an amount of data necessary to classify a particular query according to a search task, wherein the random walk module is further configured to traverse the graph using a random walk algorithm to determine a plurality of transition probabilities such that each of the plurality of transition probabilities associates a query pattern of the one or more query patterns to a search task of the one or more search tasks; and
classify the expanded training data into one or more search task categories using a classifier module configured to store training data available for classifying the particular query, wherein the particular query is associated with the task to be accomplished.

11. The system of claim 10, wherein the training data comprises one or more seed queries associated with one or more uniform resource locators (URLs).

12. The system of claim 10, wherein the one or more query patterns include time and location information.

13. The system of claim 10, wherein a transition probability of the plurality of transition probabilities is determined based, at least in part, on the probability that a random walk of the graph beginning at the query pattern associated with the transition probability will include the search task associated with the transition probability.

14. One or more computer-readable storage media storing computer-executable instructions that, when executed on one or more processors, cause the one or more processors to perform operations comprising:
receiving an input query transmitted over a network;
determining an input query pattern associated with the input query;
accessing a library comprising one or more query patterns associated with one or more predefined search task categories by one or more transition probabilities, each of the one or more predefined search task categories associated with a task to be accomplished;
classifying the input query pattern into one or more search tasks according to the one or more predefined search task categories, the classifying based at least in part on a lookup of the input query pattern in the library and identifying one or more tasks to be accomplished associated with the one or more predefined search task categories associated with a query pattern of the one or more query patterns similar to the input query pattern; and
determining a search result based at least in part on the classified one or more search tasks, the search result based at least in part on the identified one or more tasks to be accomplished.

15. The one or more computer-readable storage media of claim 14, wherein the determining comprises deconstructing the input query to ascertain an intent associated with the input query, the intent defined as computationally understanding a purpose or objective of the input query.

16. The one or more computer-readable storage media of claim 14, wherein the operations further comprise communicating the search result over the network.

17. The one or more computer-readable storage media of claim 14, wherein the library is constructed based at least in part upon a set of training data established by a task classification process, the task classification process including constructing a graph comprising the one or more query patterns associated with the one or more search tasks by one or more weighted edges.

18. The one or more computer-readable storage media of claim 14, wherein the input query is a search query transmitted over a network.

19. The one or more computer-readable storage media of claim 14, wherein a transition probability of the one or more transition probabilities represents the probability that a random walk beginning from the query pattern associated with the transition probability will include the predefined search task category associated with the transition probability.

20. The one or more computer-readable storage media of claim 19, wherein classifying the input query pattern into one or more search tasks comprises determining a set of probable search task categories associated with the input query pattern by transition probabilities that exceed a threshold value and classifying the set of probable search task categories to the one or more search tasks.

* * * * *